(12) United States Patent
Talley

(10) Patent No.: US 9,066,500 B2
(45) Date of Patent: Jun. 30, 2015

(54) RETRACTABLE LEASH APPARATUS

(71) Applicant: Rick H. Talley, Denver, CO (US)

(72) Inventor: Rick H. Talley, Denver, CO (US)

( * ) Notice: Subject to any disclaimer, the term of this patent is extended or adjusted under 35 U.S.C. 154(b) by 86 days.

(21) Appl. No.: 13/764,834

(22) Filed: Feb. 12, 2013

(65) Prior Publication Data

US 2014/0224187 A1    Aug. 14, 2014

(51) Int. Cl.
*A01K 27/00*    (2006.01)

(52) U.S. Cl.
CPC ............. *A01K 27/004* (2013.01); *A01K 27/008* (2013.01)

(58) Field of Classification Search
CPC ............... A01K 27/004; A01K 27/008; E01H 2001/128; E01H 2001/1286; B65H 75/406
USPC .......................................................... 119/796
See application file for complete search history.

(56) References Cited

U.S. PATENT DOCUMENTS

| | | | | |
|---|---|---|---|---|
| 2,217,323 A | * | 10/1940 | Sackett | 242/379.2 |
| 2,647,703 A | * | 8/1953 | Hayes | 242/381.6 |
| 6,314,917 B1 | | 11/2001 | Ryan | |
| 6,694,922 B2 | | 2/2004 | Walter et al. | |
| 7,044,080 B2 | | 5/2006 | Rabello | |
| 8,100,445 B1 | | 1/2012 | Brar | |
| 8,256,385 B2 | * | 9/2012 | Goldenberg | 119/796 |
| 2010/0300375 A1 | * | 12/2010 | Yang | 119/796 |
| 2011/0067649 A1 | * | 3/2011 | O'Brien et al. | 119/796 |
| 2011/0114032 A1 | * | 5/2011 | Reed | 119/796 |
| 2012/0098281 A1 | * | 4/2012 | Sigmund | 294/1.3 |
| 2012/0318212 A1 | * | 12/2012 | Montenegro | 119/792 |
| 2014/0158064 A1 | * | 6/2014 | Cooligan-Knoefel | 119/796 |

* cited by examiner

*Primary Examiner* — Son T Nguyen
(74) *Attorney, Agent, or Firm* — Dale J. Ream

(57) ABSTRACT

A retractable leash apparatus includes opposed first and second open ends and defines an interior area. A retraction assembly is operatively coupled to the handle member and defines an inner space and an aperture, the retraction assembly having a spool rotatably positioned in the inner space. A leash member having a first end is connected to the spool, the spool being selectively movable between a retracted configuration in which the leash is substantially inside the inner space and an extended configuration in which the leash member is substantially outside the inner space. The handle member includes a partition positioned in the handle member interior area so as to divide the handle member interior area into a first interior portion and a second interior portion, the first interior portion being selectively accessible through the first open end and the second interior portion being selectively accessible through the second open end.

5 Claims, 7 Drawing Sheets

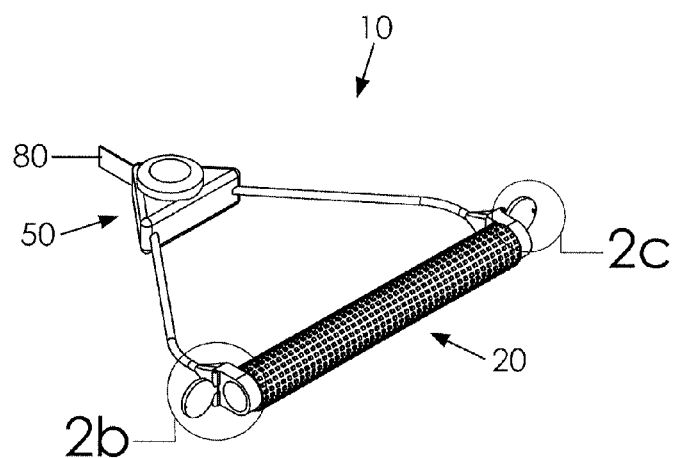
Fig. 2a
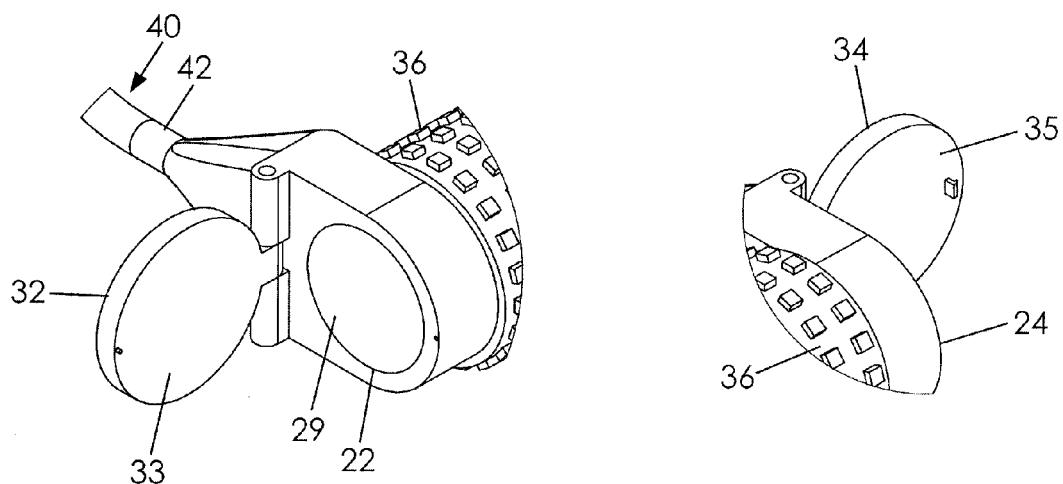
Fig. 2b
Fig. 2c

RETRACTABLE LEASH APPARATUS

BACKGROUND OF THE INVENTION

This invention relates generally to pet leash devices and, more particularly, to a retractable leash apparatus having a retractable leash and that provides segregated compartments in a handle member and rotary control for leash extension and retraction.

Taking a dog for a walk almost always requires putting the dog on a leash except maybe in a purely rural setting or at a dog park where the dog may be allowed to run free. The dog is allowed to roam closer or farther away from the dog walker but only so far as the length of the leash itself. Larger or particularly energetic dogs can be difficult to control during a leash-constrained walk in that the dog may run in front of, behind, or side to side with great force in an effort to break free of the leash.

Obviously, this action by the dog can be challenging both to the walker and to the dog. Specifically, the dog walker may have difficulty holding onto the end of a traditional leash or simply grow weary in doing so. The dog may become frustrated at not having freedom to roam farther away from the walker. Even using a longer leash has its disadvantages in that a longer leash may get wrapped around the dog walker's legs as the dog circles the walker one or more times.

Still another disadvantage of using a traditional leash while walking a dog is what a user is to do with miscellaneous items while walking the dog such as car keys, money and coins, baggies to pick up dog waste, and the like. This is especially a problem during warm summer months where the dog walker may be wearing shorts or a swimsuit having no pockets. Trying to carry these items is made even more difficult if using a traditional leash for all of the reasons described above.

Therefore, it would be desirable to have a retractable leash apparatus that includes a leash that is selectively retracted into or extended from a housing such that the leash does not get tangled around the dog walker's legs and the dog walker is not jerked around so much by an aggressive or large dog. Further, it would be desirable to have a retractable leash apparatus having a handle that is easier for the dog walker to hold onto and that includes compartments for the dog walker's personal items.

SUMMARY OF THE INVENTION

A retractable leash apparatus according to a preferred embodiment of the present invention includes opposed first and second open ends and defining an interior area therebetween. A retraction assembly is operatively coupled to the handle member and defining an inner space and an aperture, the retraction assembly having a spool rotatably coupled in the inner space. A leash member includes a flexible and elongate configuration and a first end connected to the spool, wherein the spool is selectively movable between a retracted configuration in which the leash is substantially inside the inner space and an extended configuration in which the leash member is substantially outside the inner space. The handle member includes a partition positioned in the handle member interior area so as to divide the handle member interior area into a first interior portion and a second interior portion, the first interior portion being selectively accessible through the first open end and the second interior portion being selectively accessible through the second open end.

Therefore, a general object of this invention is to provide a retractable leash apparatus for walking a dog having a handle member and a retractable leash movable between retracted and extended configurations.

Another object of this invention is to provide a retractable leash apparatus, as aforesaid, having a handle member that may be gripped securely even when a dog leashed to it is active, aggressive, and strong.

Still another object of this invention is to provide a retractable leash apparatus, as aforesaid, in which the handle member includes multiple compartments configured to store personal items and dog supplies, the compartments being segregated from one another.

Yet another object of this invention is to provide a retractable leash apparatus, as aforesaid, having open ends with doors that selectively provide access to the compartments.

A further object of this invention is to provide a retractable leash apparatus, as aforesaid, in which the handle end doors are magnetic for preventing coins, keys, or other metallic items from falling from a compartment unintentionally.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2a is another perspective view of the leash apparatus as in FIG. 1;

FIG. 2b is an isolated view on an enlarged scale taken from a portion of FIG. 2a;

FIG. 2c is an isolated view on an enlarged scale taken from a portion of FIG. 2a;

FIG. 4b is a sectional view taken along line 4b-4b of FIG. 4a;

FIG. 5b is a sectional view taken along line 5b-5b of FIG. 5a;

FIG. 6b is an isolated view on an enlarged scale taken from a portion of FIG. 6a;

FIG. 7b is a sectional view taken along line 7b-7b of FIG. 7a.

DESCRIPTION OF THE PREFERRED EMBODIMENT

Figure 1:
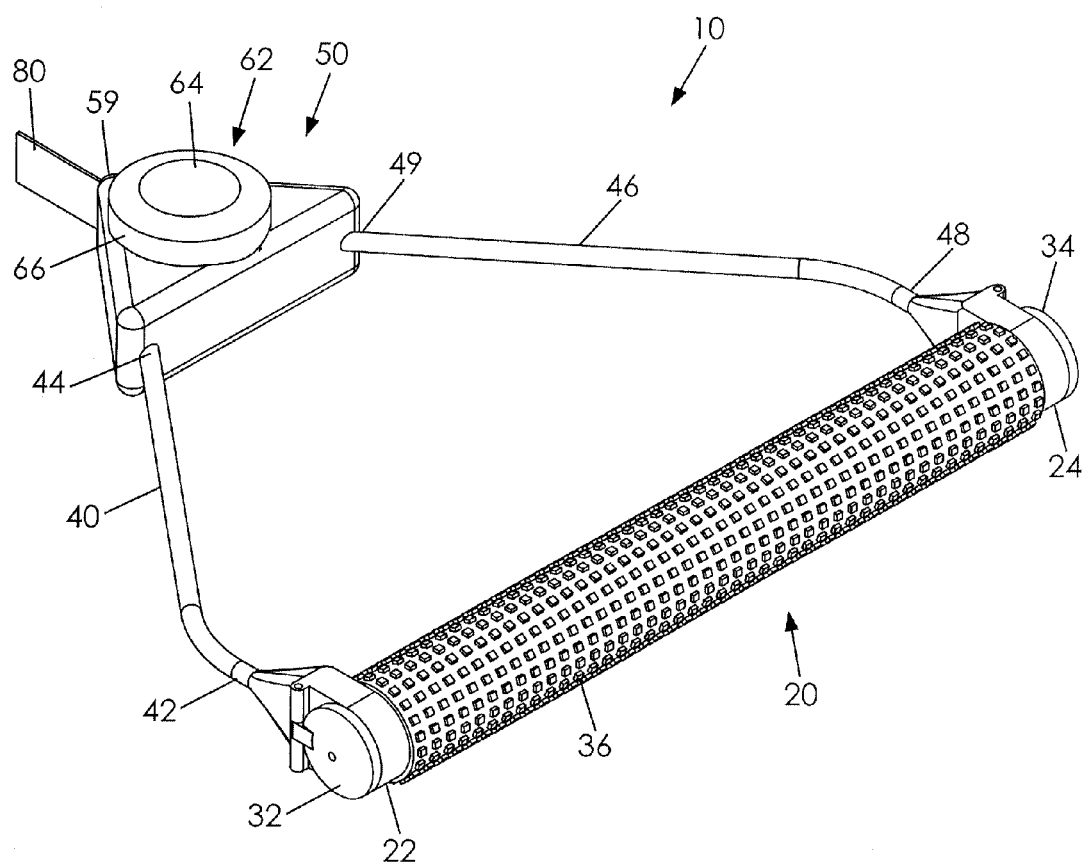
FIG. 1 is a perspective view of a retractable leash apparatus according to a preferred embodiment of the present invention.

A retractable leash apparatus according to a preferred embodiment of the present invention will now be described in detail with reference to FIGS. 1 to 7b of the accompanying drawings. The retractable leash apparatus 10 includes a handle member 20, a retraction assembly 50, and a leash member 80.

The handle member 20 includes a generally cylindrical configuration (FIG. 1) having opposed first 22 and second 24 ends although the handle member 20 may, in some embodiments, have a cubical, cuboid, triangular prism, or other suitable configuration. The handle member 20 has a generally hollow construction that defines an interior area. The first end 22 and second end 24 are open and through which articles may be inserted into the interior area defined by the handle member 20.

Figure 7A:
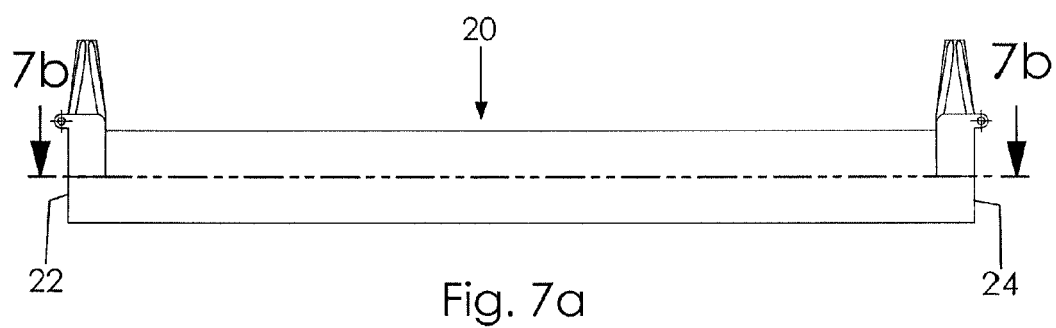
FIG. 7a is a top view of the handle member shown in FIG. 1.
Figure 7B:
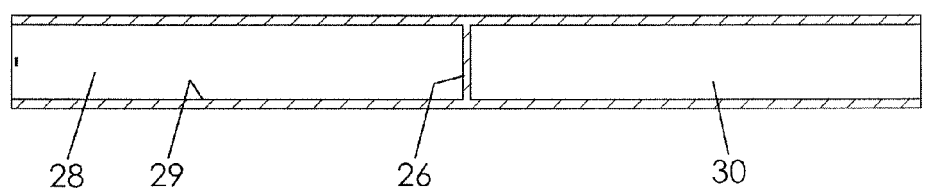

The handle member 20 may include a partition 26 positioned in the interior area so as to define a first interior portion 28 and a second interior portion 30 (FIG. 7b). The first interior portion 28 is accessible through the open first end 22 of the handle member 20. Similarly, the second interior portion 30 is accessible through the open second end 24. A first door 32 may be pivotally coupled to the first end 22 of the handle member 20 and selectively movable between an open configuration (FIGS. 2a to 2c) enabling access to the first interior portion 28 and a closed configuration (FIG. 1) preventing access to the first interior portion 28. Similarly, a second door 34 may be pivotally coupled to the second end 24 of the handle member 20 and selectively movable between an open configuration (FIGS. 2a to 2c) enabling access to the second interior portion 30 and a closed configuration (FIG. 1) preventing access to the second interior portion 30. The doors may be held in the closed configuration with a clasp, friction fit configuration, or other suitable fastener.

A first magnet 33 or magnetic coating may be coupled to an inner surface of the first door 32 that is configured to attract metal objects that may be positioned in the first interior portion 28. For instance, the first magnet 33 may be configured to attract coins, keys, tokens, timepieces, or the like that may have been inserted into the first interior area for safekeeping but that subsequently shift and be undesirably lost if not otherwise captured. In one embodiment, a second magnet 35 or magnetic coating may be coupled to an inner surface of the second door 34 that is configured to attract metal objects that may be positioned in the second interior portion 30. In another embodiment, the second door 34 may not be equipped with a second magnet but rather anticipate the storage of non-magnetic items in the second interior area, such as plastic bags useful for collection of pet waste while walking the pet. In still another embodiment, an inner surface 29 of at least the first interior portion 28 of the handle member 20 includes a magnetic surface configured to attract metal objects that may be positioned in the first interior portion 28. It is understood that the magnets or magnetic surfaces have a mild magnetic attraction that can be overcome by a user pulling force, by shaking, etc.

The handle member 20 preferably includes a tactile grip member 36 extending substantially between the handle first 22 and second 24 ends (FIG. 1). The grip member 36 may be constructed of rubber of a synthetic material that provides enhanced grip to a person's hands. In addition, the grip member 36 may include a plurality of nubs or other variations in surface relief.

A pair of extension members 40, 46 connect the handle member 20 to the retraction assembly 50 such that the retraction assembly 50 is forwardly displaced from the handle member 20 (FIG. 1). More particularly, the first 40 and second 46 extension member includes respective first ends 42, 48 coupled to first 22 and second 24 ends of the handle member 20. The first 40 and second 46 extension members then extend away from respective first 22 and second 24 ends of the handle member 20. The extension members may be understood and referred to as arms or struts. Each extension member 40, 46 includes respective second ends 44, 49 coupled to the retraction assembly 50 such that the retraction assembly 50 is displaced forwardly from the handle member 20. The extension members may curve inwardly toward the retraction assembly 50 and, as a result, take on the appearance of a wakeboard handle assembly.

The retraction assembly 50 is operatively coupled to the handle member 20. Specifically, the retraction assembly 50 includes a housing 52 that is coupled to second ends 44, 49 of respective first 40 and second 46 extension members (FIG. 1). The housing 52 defines an inner space 54 configured to receive a spool 56, the spool 56 being rotatably mounted in the inner space 54. A front end 59 of the housing 52 defines a forward aperture 57.

The leash member 80 may have a flexible and elongate configuration having a first end 82 coupled to the spool 56. The leash member has a second end (not shown) configured to be coupled to a collar of a pet, such as to take the pet for a walk. The spool 56 is rotatably mounted in the inner space 54 of the retraction assembly housing 52 and movable between a retracted configuration in which the leash member 80 is wrapped about the spool 56 substantially inside the inner space 54 and an extended configuration substantially outside the inner space 54. Preferably, the inner space 54 has a generally cylindrical configuration complementary to a configuration of a traditional spool 56 such that the spool 56 may be selectively received into the inner space 54. It is understood that in use, a dog may be enabled to unwind a portion of the leash member 80 while on a walk.

Figure 3:
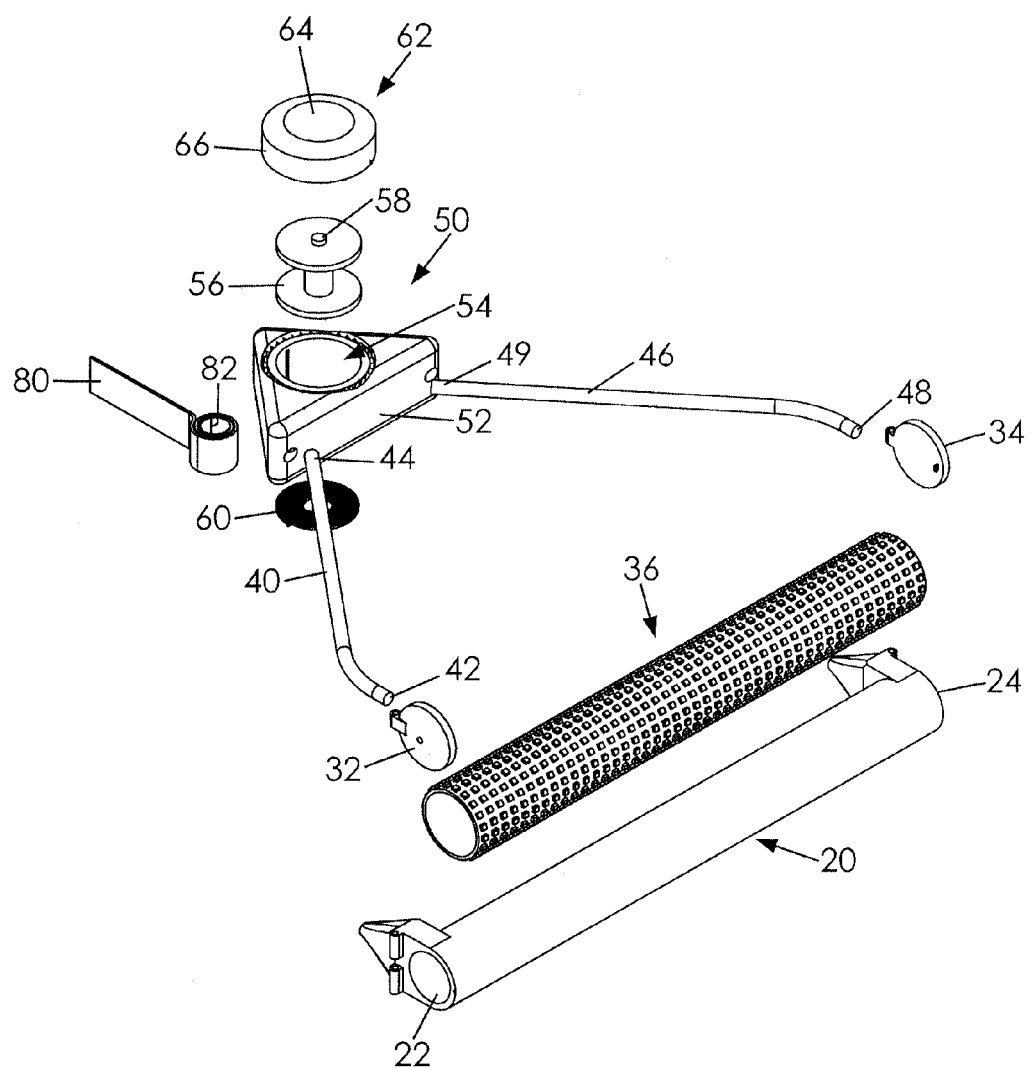
FIG. 3 is an exploded view of the leash apparatus as in FIG. 1.
Figure 4A:
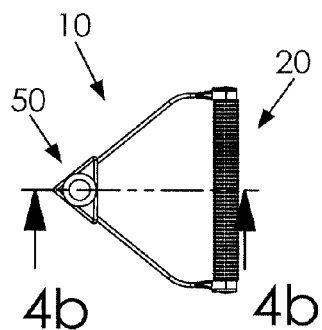
FIG. 4a is a top view of the leash apparatus as in FIG. 1.
Figure 4B:
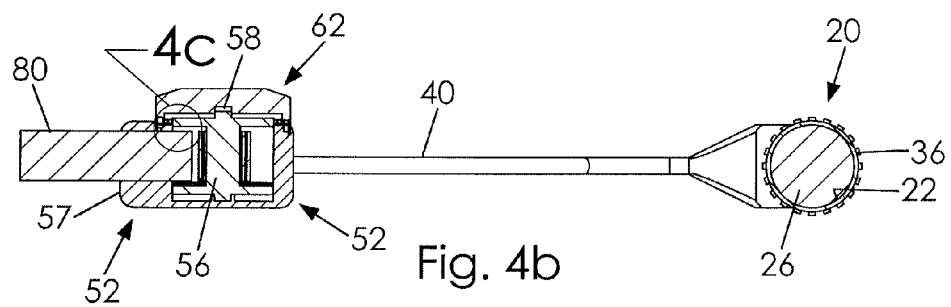
Figure 5A:
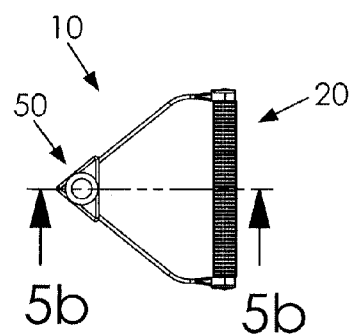
FIG. 5a is a top view of the leash apparatus as in FIG. 1.
Figure 5B:
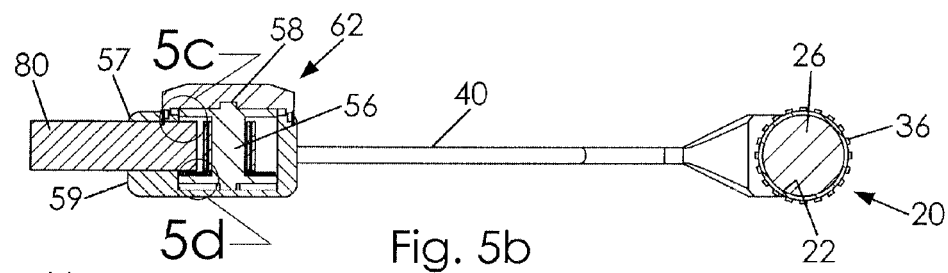

The retraction assembly 50 further includes a retraction spring 60 positioned in a lower portion of the inner space 54 of the housing 52 and operatively coupled to the spool 56 (FIGS. 3, 4b, and 5b). The spring 60 is normally biased to urge the spool 56 toward the retracted configuration. The spring 60, however, allows the spool 56 to move toward the extended configuration but automatically retracts the leash member 80 when pulling force is released.

The retraction assembly 50 may include a rotary member 62 having a top wall 64 and a side wall 66 that extends inwardly away from the top wall 64 so as to define an inside area. It is understood that the rotary member 62 may be constructed in the form of a cap. The rotary member 62 may be rotationally coupled to the retraction assembly housing 52 and spool 56. The rotary member 62 and housing 52 include a stop assembly configured to enable a user to selectively determine when the spool 56 is permitted to move toward the extended configuration and when the spool 56 is prevented from moving.

Figure 6A:
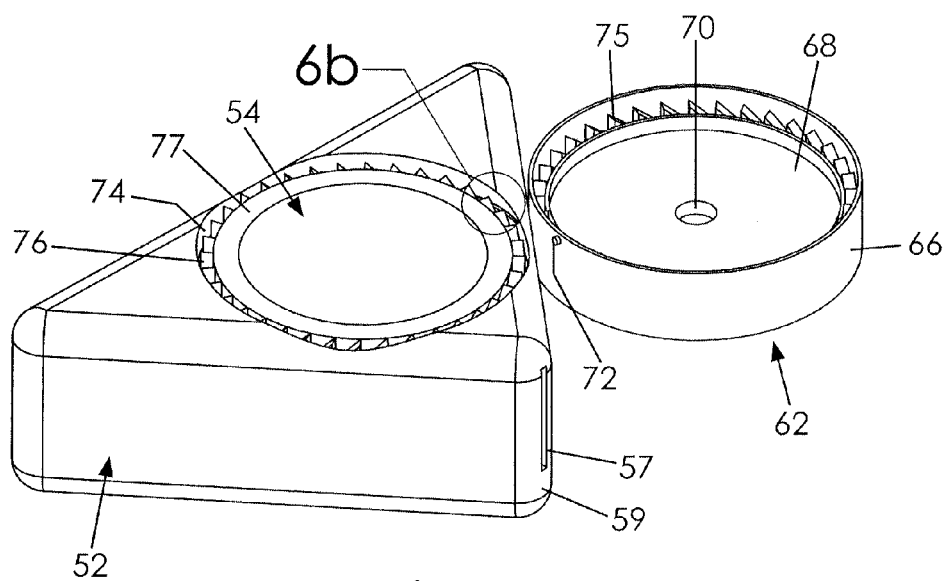
FIG. 6a is an isolated view of a retraction assembly according to the present invention.
Figure 6B:
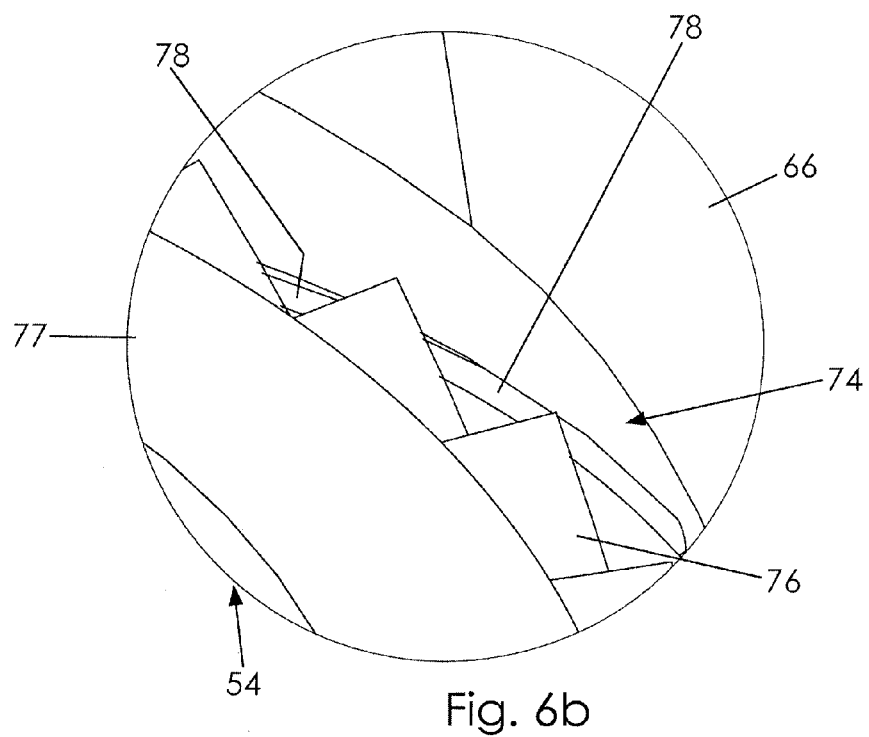

With specific reference to FIG. 6a, the inner surface 68 of the top wall 64 of the rotary member 62 defines a recess 70 having a configuration that is complementary to a post 58 on an upper end of the spool (FIG. 3). The rotary member 62 is coupled to the spool 56 by this post 58/recess 70 combination. The rotary member 62 includes a plurality of rotary member teeth 75 mounted radially on the top wall inner surface 68 adjacent the side wall (FIG. 6a). The rotary member 62 also includes a flange 72 or fastener mounted to an outer surface of the side wall (FIG. 6a).

The retraction assembly housing 52 defines a channel 74 that extends radially about an upper end of the inner space 54 that is defined by the housing 52. The channel 74 has a circular configuration having a diameter larger than that of the inner space 54 of the housing 52 that receives the spool 56.

The diameter of the channel 74 is also larger than a diameter of the side wall 66 of the rotary member 62 for reasons that will be described below.

Figure 4C:
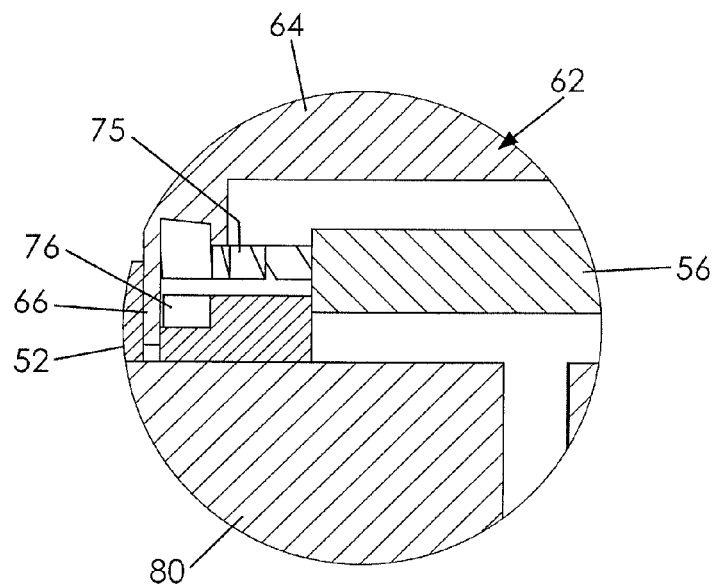
FIG. 4c is an isolated view on an enlarged scale taken from a portion of FIG. 4b.
Figure 5C:
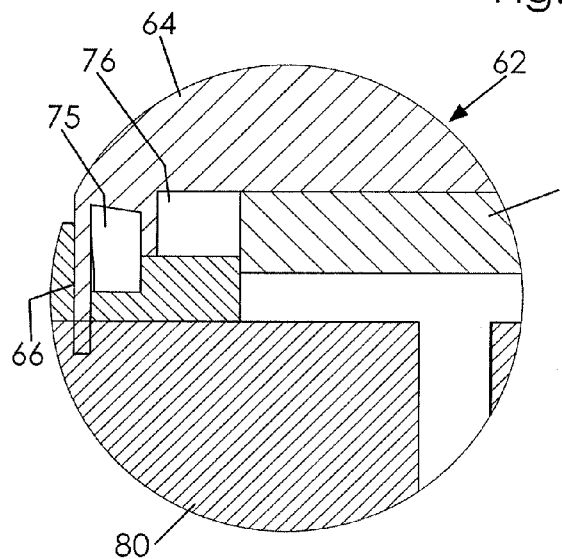
FIG. 5c is an isolated view on an enlarged scale taken from a portion of FIG. 5b.
Figure 5D:
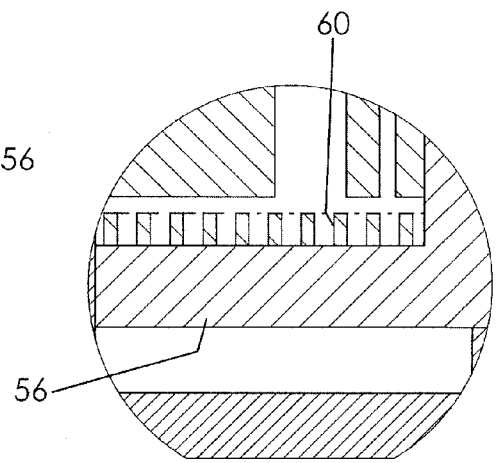
FIG. 5d is another isolated view on an enlarged scale taken from a portion of FIG. 5b.

The housing 52 includes a plurality of housing teeth 76 positioned in the channel 74 that are configured to selectively engage the rotary member teeth 75 as will be described below. The housing 52 also includes ramp 78 outwardly adjacent a portion of the housing teeth 76, the ramp 78 being sloped downwardly as shown particularly in FIG. 6b. When the rotary member 62 is inverted and coupled to the housing 52, the flange 72 is supported upon the ramp 78 and the rotary member teeth 75 are vertically adjacent the housing teeth 76 but not engaged (FIG. 4c). However, when the rotary member 62 is rotated such that the flange 72 moves downwardly along the downwardly sloping ramp 78 (FIG. 6b), the rotary member teeth 75 engage the housing teeth 76 (FIG. 5c). Conversely, when the rotary member 62 is rotated so that the flange 72 moves upwardly along the sloping ramp 78, the rotary member teeth 75 are released from the housing teeth 76 (FIG. 4c). The spool 56 is configured to be rotated only when the respective teeth are disengaged. As seen particularly in FIGS. 6a and 6b, there may be a lip 77 situated between the interior space 54 and the housing teeth 75 and ramp 78.

In use, a user of the retractable leash apparatus 10 may open the first door 32 of the handle member 20 and insert items therein for temporary storage, such as car keys, loose change, cash, or the like. The first door 32 may then be closed. Similarly, the second door 34 may be opened such as to insert pet waste bags or other articles. The second end (not shown) of the leash member 80 may be coupled to a pet's collar and the activity of taking the pet for a walk may begin.

As the pet walks ahead of the user, the spool 56 moves toward the extended configuration so as to allow a length of the leash member 80 to extend outside the retraction assembly housing 52—effectively lengthening the leash member 80. If the user desires to stop the leash member 80 from extending any further, he may rotate the rotary member 62 so as to engage the respective teeth as described above. Later, the user may again release the engagement of the teeth. When there is slack in the leash member 80, the retraction spring 60 automatically causes the spool 56 to move toward the retracted configuration, i.e. to wind up the leash member inside the inner space 54 of the housing 52.

It is understood that while certain forms of this invention have been illustrated and described, it is not limited thereto except insofar as such limitations are included in the following claims and allowable functional equivalents thereof.

The invention claimed is:

1. A retractable leash apparatus, comprising:
   a handle member having opposed first and second open ends and defining an interior area therebetween;
   a retraction assembly operatively coupled to said handle member and defining an inner space and an aperture, said retraction assembly having a spool rotatably coupled in said inner space;
   a leash member having a flexible and elongate configuration and having a first end connected to said spool, said spool being selectively movable between a retracted configuration in which said leash is substantially inside said inner space and an extended configuration in which said leash member is substantially outside said inner space;
   wherein said handle member includes a partition positioned in said handle member interior area at a point midway between said first and second open ends so as to divide said handle member interior area into a first interior portion and a second interior portion immediately adjacent said first interior portion, said first interior portion being selectively accessible through said first open end and said second interior portion being selectively accessible through said second open end;
   wherein said handle member includes:
      a first door pivotally coupled to said first open end and selectively movable between a first open configuration enabling access to said first interior portion and a first closed configuration preventing access to said first interior portion;
      a second door pivotally coupled to said second open end and selectively movable between a second open configuration enabling access to said second interior portion and a second closed configuration preventing access to said second interior portion;
      said handle member includes a first magnet coupled to an inner surface of said first door configured to attract metallic objects placed in said first interior portion;
   wherein said retraction assembly includes: a housing defining said retraction assembly inner space, said inner space having a generally cylindrical configuration complementary to a configuration of said spool; a retraction spring mounted in said inner space and operatively coupled to said spool and biased to rotate said spool move said spool toward said retracted configuration; a rotary member coupled to said spool and having a stop assembly for selectively regulating movement of said leash member toward said extended configuration, said rotary member having a top wall and a side wall extending inwardly away from said top wall so as to define an inside area, said rotary member top wall having an inner surface rotatably coupled to said spool, said rotary member including a plurality of rotary member teeth positioned radially on said top wall inner surface adjacent said side wall; and a flange positioned on an outer surface of said rotary member side wall; wherein: said retraction assembly housing defines a channel extending radially about an upper end of said inner space, said retraction assembly housing including a plurality of housing teeth positioned in said channel and a ramp adjacent said plurality of housing teeth; said housing channel is configured to receive said flange in contact with said ramp and to allow said flange to move along said ramp such that said rotary member is selectively rotatable relative to said housing; said housing teeth are adjacent said rotary member teeth when said flange is received in said channel; wherein said ramp is sloped downwardly such that said rotary member teeth are engaged with said housing teeth when said rotary member flange is moved downwardly along said ramp and said rotary member teeth are released from said housing teeth when said flange is moved upwardly along said ramp; and said spool configured to rotate when said rotary member teeth are released from said housing teeth and to be prevented from rotating when said rotary member teeth are engaged with housing teeth.

2. The retractable leash apparatus as in claim 1, wherein an inner surface of said first interior portion includes a magnetic surface configured to attract metallic objects placed in said first interior portion.

3. The retractable leash apparatus as in claim 1, wherein an inner surface of said first interior portion includes a magnetic surface configured to attract metallic objects placed in said first interior portion.

4. The retractable leash apparatus as in claim 1, comprising first and second extension members having respective first and second extension member first ends coupled to said first and second open ends of said handle member, respectively, and extending forwardly therefrom, said first and second extension members having respective first and second extension member second ends coupled to said retraction assembly such that said retraction assembly is displaced from said handle member.

5. The retractable leash apparatus as in claim 1, comprising a tactile grip member removably coupled to said handle member, said tactile grip member extending substantially between said handle member first and second open ends.

\* \* \* \* \*